United States Patent
Elleuch et al.

(10) Patent No.: US 11,977,572 B2
(45) Date of Patent: May 7, 2024

(54) METHOD AND SYSTEM FOR DETECTING A PATTERN IN COMMON IN A SET OF TEXT FILES

(71) Applicant: Orange, Issy-les-Moulineaux (FR)

(72) Inventors: Marwa Elleuch, Chatillon (FR); Oumaima Alaoui Ismaili, Chatillon (FR); Nassim Laga, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 454 days.

(21) Appl. No.: 17/203,535

(22) Filed: Mar. 16, 2021

(65) Prior Publication Data

US 2021/0287175 A1    Sep. 16, 2021

(30) Foreign Application Priority Data

Mar. 16, 2020 (FR) ...................................... 2002573

(51) Int. Cl.
*G06F 16/35* (2019.01)
*G06F 16/36* (2019.01)
*G06Q 10/10* (2023.01)
*G06V 30/196* (2022.01)

(52) U.S. Cl.
CPC ............ *G06F 16/35* (2019.01); *G06F 16/374* (2019.01); *G06Q 10/10* (2013.01); *G06V 30/1985* (2022.01)

(58) Field of Classification Search
None
See application file for complete search history.

(56) References Cited

U.S. PATENT DOCUMENTS

2007/0010993 A1* 1/2007 Bachenko ............ G06F 40/253 704/9
2022/0414603 A9* 12/2022 Agarwal .............. G06Q 10/107

OTHER PUBLICATIONS

Mujtaba, Ghulam et al., "Email Classification Research Trends: Review and Open Issues", IEEE Access, vol. 5, Jun. 28, 2017, pp. 9044-9064.
Tang, Guanting et al., "Email mining: tasks, common techniques, and tools", Knowledge and Information Systems, Springer Verlag, London, GB, vol. 41, No. 1, Jun. 4, 2013, pp. 1-31.
Preliminary Search Report for French Application No. 2002573.

* cited by examiner

*Primary Examiner* — Antim G Shah
(74) *Attorney, Agent, or Firm* — Knobbe, Martens, Olson & Bear, LLP

(57) ABSTRACT

A method of detecting a pattern in common in two text files, each comprising an ordered sequence of words, is disclosed. The method includes generating groups of words having the same syntactic function, comprising at least one word from each text file such that each word in a group is synonymous with another word in the same group, associating each word in a text file belonging to a group of words with a tag representative of the group, generating, for each text file, at least one dense set of words satisfying a condition of internal proximity in the text file, determining at least one pattern in common in the two text files, a pattern in common including one or more sets of words sharing the same tag and comprising at least one word from a dense set of words in each text file.

14 Claims, 2 Drawing Sheets

METHOD AND SYSTEM FOR DETECTING A PATTERN IN COMMON IN A SET OF TEXT FILES

CROSS-REFERENCE TO RELATED APPLICATIONS

This application claims foreign priority to FR 2002573, filed Mar. 16, 2020. The contents of that application are incorporated by reference herein in its entirety.

BACKGROUND

Field

The field of the invention relates to the detection of a pattern in common in a set of text files.

The method and system for detecting a pattern in common which are the aim of the invention are intended in particular for the classification of text files, and in particular the classification of emails in an electronic mail system.

Description of the Related Technology

Today, most techniques for classifying text files rely on elements of these text files that are specifically dedicated to their classification, whether a title, a header, or, more directly, keywords. These elements dedicated to classification are also more simply called "tags". In the case where the text files are emails, classification within the electronic mail system is for example implemented using words present in the "subject" field of the emails.

The classification of emails within an electronic mail system represents a major technical issue, particularly concerning the economizing of storage resources allocated for the storage of emails.

However, more sophisticated text file classification methods have been developed to allow more efficient classification, particularly when there is no element of a text file that is specifically dedicated to such classification. These new methods are based on detecting patterns in common within a set of text files.

Among the techniques for detecting patterns in common, one will note for example the APriori algorithm which allows determining redundant properties in a set of data and more generally the application of techniques for searching for association rules (better known under the acronym "FIM" for "Frequent Itemset Mining") in the specific case of textual data. These techniques are based on the coexistence of the same words within several text files. However, the patterns generated using such techniques do not take into account the relative positions of words in common. The dispersion of the words in common of a pattern renders it irrelevant or even unusable for classification.

To overcome this disadvantage, new techniques have been proposed that are based on the detection of word sequences which take into account the order of appearance of words. However, these techniques (better known by the acronym "MWE" for "Multiple Words Expression") only give very incomplete results, due to the fact that the same topic or subject of a text file may be characterized by another sequence of words or more simply by the same words in another order of appearance.

SUMMARY OF CERTAIN INVENTIVE ASPECTS

The present invention improves the situation.

To do so, the invention relates to a method for detecting a pattern in common in a set of text files, each text file comprising an ordered sequence of words.

The detection method is implemented by computer means and comprises:

generating, for at least one pair of first and second text files in the set of text files, one or more groups of words each comprising at least one word in the first text file and at least one word in the second text file, the words in a same group of words having the same syntactic function, and each word in a group of words belonging to a set of words synonymous for that syntactic function with another word in that group of words, associating each word in a generated group of words with a tag representative of that group of words, generating, for each text file among the first and second text files, at least one dense set of words associated with a tag and satisfying a condition of internal proximity in that text file, determining at least one pattern in common in the first and second text files, a pattern in common including one or more sets of words sharing the same tag and comprising at least one word from a dense set of words in each text file among the first and second text files.

The detection method takes into account variations in the relative positions and the dispersion of words in common and of their synonyms, from one text file to another. Taking the syntactic function of the words into account makes it possible to avoid generating noise from incidental patterns in common.

The set of synonyms of a word according to its syntactic function is determined for example by a search in a lexical database.

The use of a lexical database makes it possible to avoid missing patterns in common that are expressed by different word sequences.

In one or more embodiments, the detection method further comprises a preprocessing of at least the first and second text files, implemented before generating the group or groups of words.

The preprocessing comprises one or more of the following operations: lemmatization, detection of compound words, deletion of stop words, detection of redundant words, replacement of numeric values by a tag, replacement of proper names by a tag, and detection and deletion of redundant text blocks.

In one or more embodiments, the generating of the group or groups of words comprises:

for any given word in the first text file, if there is a word in the second text file such that the given word in the first text file and the word in the second text file have the same syntactic function and such that one among the given word in the first text file and the word in the second text file belongs to a set of words synonymous with the other for that syntactic function, classifying the given word in the first text file and the word in the second text file in a same group of words, for any given word in the first or second text file, if there is a group of words such that the syntactic function of the given word is the same as the syntactic function of the words in that group of words and such that the given word belongs to the set of words synonymous for the syntactic function with at least one of the words in that group of words, classifying the given word in this group of words, and if two groups of words are identical, deleting either one of the two groups of words.

Furthermore, each word in a given text file among the first and second text files is associated with a numeric value representative of a position of that word within the text file.

For example, the numeric representative of a position of a word within a text file is determined according to the rank of the given word in the ordered sequence of words in the text file.

Thus, in one or more embodiments, the generation, for a text file, of at least one dense set of words from this text file, is implemented as follows:

if the absolute value of the difference of the numeric values respectively associated with two words is less than or equal to a predetermined threshold, classifying the two words in a same dense set of words from the text file, otherwise, classifying the two words into separate dense sets of words from the text file.

In one or more embodiments, the detection method further comprises the deletion of patterns in common that include less than two sets of words.

In one or more embodiments, the detection method further comprises the updating of a pattern database by comparing each set of words of a pattern in common in a pair of text files to each set of words of a pattern in common in another pair of text files.

For example, the updating of the pattern database comprises: if a set of words of a pattern in common in a first pair of text files is comprised in a set of words of a pattern in common in a second pair of text files, supplementing the set of words of the pattern in common in the first pair of text files with one or more missing words coming from the set of words of the pattern in common in the second pair of text files.

In one or more embodiments, the detection method further comprises the filtering of the patterns in common according to a frequency of occurrence of these patterns in common, a pattern in common being deleted if its frequency of occurrence across the set of text files is below a predetermined threshold frequency.

The present invention also relates to a method for classifying text files, comprising:

receiving a set of text files, detecting, for at least one pair of first and second text files in the set of text files, at least one pattern in common by using the detection method described above, storing each detected pattern in common, in a pattern database, generating a label characteristic of a set of patterns stored within the pattern database, and classifying each text file in a database of text files according to a label associated with a set of patterns comprising at least one pattern detected in this text file.

Typically, one or more text files in the set of text files are emails and the database of text files is comprised in an electronic mail system.

The invention also relates to a computer program comprising instructions for implementing the method described above, whether the detection method or the classification method, when the instructions are executed by at least one processor.

The invention further relates to a system for detecting a pattern in common in a set of text files, each text file comprising an ordered sequence of one or more words.

The detection system comprises:

a tagging module arranged to generate, for at least one pair of first and second text files in the set of text files, one or more groups of words each comprising at least one word in the first text file and at least one word in the second text file, the words in a same group of words having the same syntactic function, and each word in a group of words belonging to a set of words synonymous for this syntactic function with another word in this group of words, the tagging module further being arranged to associate, with each word in a generated group of words, a tag representative of the group of words, a grouping module arranged to generate, for each text file among the first and second text files, at least one dense set of words associated with a tag and satisfying a condition of internal proximity in the text file, a correlation module arranged to determine at least one pattern in common in the first and second text files, a pattern in common including one or more sets of words sharing the same tag and comprising at least one word from a dense set of words in each text file among the first and second text files.

Finally, the invention relates to a system for classifying text files, comprising:

a communication module arranged to receive a set of text files, a system for detecting a pattern in common as described above, arranged to detect at least one pattern in common for at least one pair of first and second text files in the set of text files, a pattern database arranged to store each detected pattern in common, a labeling module arranged to generate a label characteristic of a set of patterns stored within the pattern database, a database of text files that is arranged to store each text file received by the communication module, the text file being classified within the database of text files according to a label associated with a set of patterns comprising at least one pattern detected in the text file.

BRIEF DESCRIPTION OF THE DRAWINGS

Other features, details and advantages will be apparent from reading the following detailed description, and from analyzing the accompanying drawings, in which.

DETAILED DESCRIPTION OF CERTAIN ILLUSTRATIVE EMBODIMENTS

Figure 1:
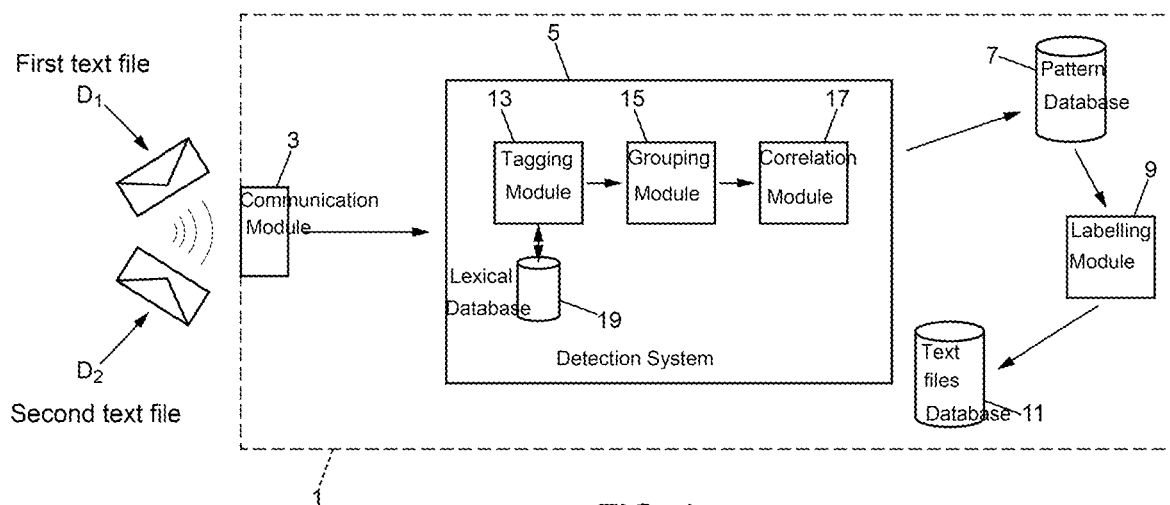
FIG. 1 illustrates a system for classifying text files, according to the invention.

FIG. 1 illustrates a system for classifying text files, hereinafter the system 1.

The system 1 comprises a communication module 3, a system for detecting a pattern in common in a set of text files, hereinafter the detection system 5, a pattern database 7, a labeling module 9, and a database of text files 11.

Figure 2:
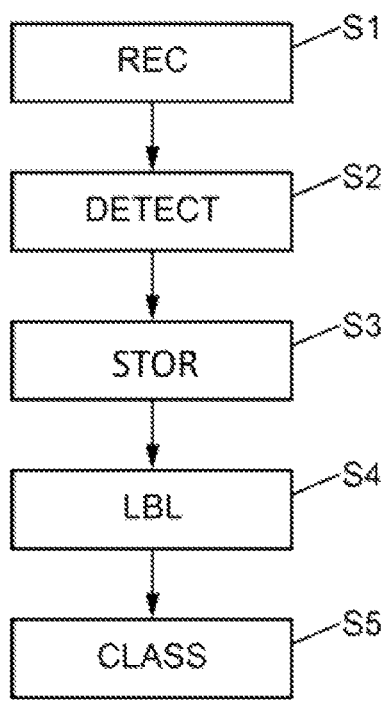
FIG. 2 illustrates a method for classifying text files, according to the invention.

In the context of the invention, the system 1 is arranged to implement a method for classifying text files, illustrated in FIG. 2.

The communication module 3 is arranged to receive a set of text files. A text file comprises at least one ordered sequence of words. The text files are for example sent to the system 1, and more precisely to the communication module 3, via a network (not shown). Such a network is, for example, a LAN type of network (acronym for "Local Area Network") or WAN type of network (acronym for "Wide Area Network").

It is known to those skilled in the art that there are many different types of data communication networks, for example radio communication networks, cellular or non-cellular, and that depending on the embodiment, the communication module 3 may integrate one or more communication sub-modules, for example for radio frequency communication and configured for the transmission and reception of radio frequency signals, according to one or more technologies such as TDMA, FDMA, OFDMA, CDMA, or one or more radio communication standards such as GSM, EDGE, CDMA, UMTS, HSPA, LTE, LTE-A, WiFi (IEEE 802.11), and WiMAX (IEEE 802.16), or their variants or evolutions that are currently known or developed at a later time.

Typically, the text files received by the communication module 3 are emails. These emails may be sent to the communication module 3 for example via a wide area network such as the Internet or via an intranet.

Thus, in a first step S1, the communication module 3 receives a set of text files. As illustrated in FIG. 1, the set of text files comprises at least a first text file $D_1$ and a second text file $D_2$. As explained above, the first text file $D_1$ and the second text file $D_2$ are emails for example.

The communication module 3 then sends the set of text files received, here in particular the pair formed of the first and second text files $D_1$, $D_2$, to the detection system 5.

The detection system 5 is arranged to detect at least one pattern in common in the set of text files.

Thus, in a step S2, the detection system 5 detects at least one pattern in common in the set of text files, and in particular at least one pattern in common in the first and second text files $D_1$ and $D_2$ of the set of text files. As explained below, a pattern detected by the detection system 5 comprises one or more sets of words.

Figure 3:
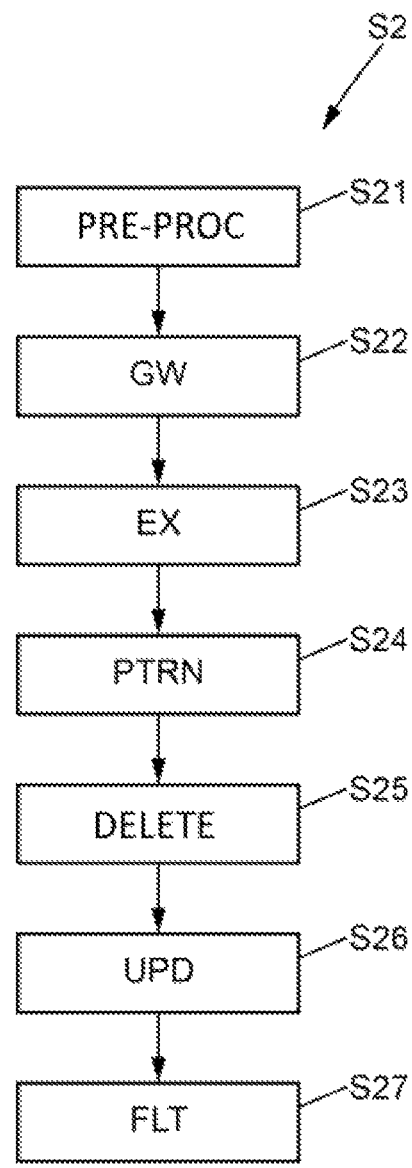
FIG. 3 illustrates a method for detecting a pattern in common in a set of text files, according to the invention.

The detection system 5 and a method for detecting a pattern in common which are the object of step S2 will be described below with reference to FIG. 3.

The pattern database 7 is arranged to store each pattern in common detected by the detection system 5.

Thus, in a step S3, the detection system 5 sends each detected pattern to the pattern database 7. Each pattern in common detected by the detection system 5 is then stored in the pattern database 7.

The labeling module 9 is arranged to generate a label characteristic of a set of patterns stored within the pattern database 11.

Thus, in a step S4, the labeling module 9 generates one or more sets of patterns, from the patterns stored in the pattern database 7. For each generated set of patterns, the labeling module generates a label characteristic of the generated set of patterns.

Furthermore, the set of patterns thus generated can be stored in the pattern database 7 in association with the label assigned by the labeling module 9.

The database of text files 11 is arranged to store each text file received for the communication module 3. As explained above, in one or more embodiments the text files received are emails, in which case the database of text files 11 is comprised in an electronic mail system, for example system 1.

Thus, in a step S5, each text file received by the communication module 3 is stored within the database of text files 11.

Advantageously, each text file is classified within the database of text files 11 according to a label associated with a set of patterns comprising at least one pattern detected in the text file.

In other words, upon receipt of a given text file, the detection system 5 detects at least one pattern in common in the given text file and in another text file in the set of text files. The pattern thus detected is correlated with the pattern database 7 in order to search for a set of patterns already labeled and comprising the pattern detected in the given text file. One or more labels can thus be assigned to the received text file and the file can be stored within the database of text files 11 in association with the assigned label or labels.

Thus, at the end of the classification method illustrated in FIG. 2, the database of text files 11 comprises one or more of the received text files, each stored in association with one or more labels. When a text file is stored in the database of text files 11 in association with a given label, this means that a pattern detected by the detection system 5 within the text file is comprised in the set of patterns to which the labeling module 9 has assigned the label in question.

In the case where the text files received are emails and the database of text files 11 is comprised in an electronic mail system, the emails thus received are therefore classified using one or more labels on the basis of patterns in common that are shared with other emails received.

As explained above, the system 1 comprises several modules, namely the communication module 3 and the labeling module 9. Each module typically comprises a memory and a processor. The memory of a module is arranged to store instructions, which when implemented by the processor result in the operation of the module.

A method for detecting a pattern in common in a set of text files, implemented by the detection system 5 illustrated schematically in FIG. 1, will now be described with reference to FIG. 3. This detection method is implemented during step S2 of the classification method described above.

To facilitate comprehension and in a non-limiting manner, a concrete example of implementing the detection method is detailed below in parallel with the description of the method and of the detection system 5. In this example, the first and second text files in the set of text files are emails $D_1$, $D_2$. These illustrative emails are reproduced below:

$D_1$: "We shall arrange a preliminary interview for trader position with this person. I have some availability next week. Can you contact him to define a time slot?"

$D_2$: "Another interview should be set with him. Last week a student forum was held and i probably found other potential candidates. I have set up some time slots with them for this week and I will send you my feedback concerning my preliminary interviews with them."

The above emails $D_1$ and $D_2$ are written in English. It is of course understood here that the language of the text files is not important and does not change the principle of the detection method implemented by the detection system 5.

As illustrated in FIG. 1, the detection system 5 comprises a tagging module 13, a grouping module 15, a correlation module 17, and a lexical database 19.

Beforehand, in a sub-step S21, the detection system 5 applies preprocessing to at least the first and second text files.

For example, the preprocessing comprises one or more of the following operations: lemmatization, detection of compound words, deletion of stop words, detection of redundant words, replacement of numeric values by a tag and replacement of proper names by a tag. The preprocessing may also comprise the detection of redundant text blocks, for example paragraphs, and where appropriate the removal of such redundant text blocks.

Lemmatization consists of replacing the occurrences of lexemes subject to inflection by their common lexical entry, also called "canonical form" or "lemma".

In the context of the concrete example developed here, the application of lemmatization to email $D_2$ makes it possible to replace the plural terms "candidates", "slots" and "interviews" by their respective canonical forms, namely their forms in the singular. These terms are therefore respectively replaced during the preprocessing by the terms "candidate", "slot" and "interview". Similarly, the past tense form "held" is replaced by the infinitive form "hold", while "concerning" is replaced by "concern".

Stop words refer to words in common that are of little or no interest in the detection of a pattern in common in text files. Typically, stop words can designate articles, prepositions, pronouns, modal verbs, auxiliaries, or even conjunctions. It should be noted that the deleted stop words may depend on the context and in particular on the subject of the processed text files.

In the concrete example, applying the deletion of stop words to email $D_1$ makes it possible to delete the following terms: "we", "shall", "a", "for", "with", "this", "I", "have", "some", "next", "can", "you", "him", "to" and "a".

The emails $D_1$ and $D_2$ obtained after preprocessing are then:

$D_1$: "arrange preliminary interview trader position person availability week contact define time slot".

$D_2$: "interview set student forum hold probably find potential candidate set time slot send feedback concern preliminary interview".

The tagging module 13 is arranged to generate, for at least one pair of first and second text files in the set of text files, one or more groups of words in the first and second text files.

Each group of words comprises at least one word in the first text file and at least one word in the second text file, the words in the same group of words having the same syntactic function. Furthermore, each word in a group of words belongs to at least one set of words synonymous for this syntactic function with another word in this group of words.

The lexical database 19 is arranged to store a set of words, and to store one or more sets of synonymous words in association with each of these words. More precisely, each word is associated with at least as many sets of words as it can have syntactic functions in a text. Thus, if a word can equally well fulfill a noun function or a verb function in a text, then the lexical database 19 stores at least a set of synonymous nouns associated with this word as well as a set of synonymous verbs associated with this word.

For the English language, the lexical database is, for example, the WordNet database.

It is understood here that the expression "set of words synonymous with a given word for the syntactic function of that word" designates the set of words, stored in the lexical database 19, associated with that word for a syntactic function of that word. Thus, the tagging module 13 is arranged to determine the syntactic function of a word in a text file and to search the lexical database 19 for a set of words synonymous with that word when that word has the syntactic function determined by the tagging module 13.

Thus, in a second sub-step S22, the tagging module 13 generates, at least for the first and second text files in the set of text files, one or more groups of words each satisfying:

$$GW = \{w_i\}_{i \in [[1,N]]} \qquad \text{Math 1}$$

$$\forall i,j \in [[1,N]], F_{sx}(w_i) = F_{sx}(w_j) = t \qquad \text{Math 2}$$

$$\forall i \in [[1,N]], \exists j \in [[1,N]] \text{ and } j \neq i, w_i \in F_{sy}(w_j,t) \qquad \text{Math 3}$$

$$\forall i \in [[1,N]], w_i \in D_1 \text{ or } w_i \in D_2 \qquad \text{Math 4}$$

$$\exists i,j \in [[1,N]], w_i \in D_1 \text{ and } w_j \in D_2 \qquad \text{Math 5}$$

where:
GW is a group of words,
N is the cardinality of the group of words GW, N being greater than or equal to 2,
$F_{sx}(w_i)$ is the syntactic function of a word $w_i$ in a text file, all words in a same group of words GW having the same syntactic function t,
$F_{sy}(w_i,t)$ is a set of words that are synonyms of $w_i$ for the syntactic function t of word $w_i$, and
$D_1$ and $D_2$ are respectively the first and second text files, Again referring to the concrete example developed here, the tagging module 13 therefore first determines the syntactic function of each word in emails $D_1$ and $D_2$. The syntactic function of each word is indicated in parentheses below:

$D_1$: "arrange (verb) preliminary (adjective) interview (noun) trader (noun) position (noun) person (noun) availability (noun) week (noun) contact (verb) define (verb) time (noun) slot (name)".

$D_2$: "interview (noun) set (verb) student (noun) forum (noun) hold (verb) probably (adverb) find (verb) potential (adjective) candidate (noun) set (verb) time (noun) slot (noun) send (verb) feedback (noun) concern (verb) preliminary (adjective) interview (noun)".

In one or more embodiments, during sub-step S22, the tagging module 13 generates the group or groups of words as follows.

For any given word in the first text file, if there is a word in the second text file such that the given word in the first text file and the word in the second text file have the same syntactic function and such that one among the given word in the first text file and the word in the second text file belongs to a set of words synonymous with the other for this syntactic function, the tagging module 13 classifies the given word in the first text file and the word in the second text file in a same group of words.

In other words:

$$\forall w_1 \in D_1, \text{if } \exists w_2 \in D_2 \text{ such that: } F_{sx}(w_1) = F_{sx}(w_2) = t \qquad \text{Math 6}$$

$$\text{and } w_2 \in F_{sy}(w_1,t) \text{ or } w_1 \in F_{sy}(w_2,t) \qquad \text{Math 7}$$

Then $w_1$ and $w_2$ are classified in a same group of words GW.

where:
$w_1$ is a given word in the first text file $D_1$, and
$w_2$ is a word in the second text file $D_2$.

Thus, concerning emails $D_1$ and $D_2$, the initial groups obtained are listed in the table below:

TABLE 1

| Groups | Words |
| --- | --- |
| GW1 | arrange, set, set |
| GW2 | preliminary, preliminary |
| GW3 | interview, interview |
| GW4 | define, set, set |
| GW5 | time, time |
| GW6 | slot, slot |

In the above table, the group GW2 comprises two words: the word "preliminary" from the first email $D_1$ and the word "preliminary" from the second email $D_2$. Indeed, these two words have the same syntactic function, namely the adjective function, and the word "preliminary" from the first email $D_1$ is of course an adjective synonymous with the word "preliminary" from the second email $D_2$, since it is in fact the same word.

Then, for any given word in the first or second text file, if there is a group of words such that the syntactic function of the given word is the same as the syntactic function of the words in this group of words and such that the given word belongs to the set of words synonymous for this syntactic function with at least one of the words in this group of words, the tagging module 13 classifies the given word in this group of words. The initial groups of words outlined above are thus supplemented.

In other words:

$$\forall w \in D_1 \cup D_2 \qquad \text{Math 8}$$

if $\exists GW = \{w_i\}_{i \in [[1,N]]}$ with $F_{sx}(w_i) = t \forall i \in [[1,N]]$ such that: Math 9

$$F_{sx}(w) = t \text{ and } \exists i \in [[1,N]] \text{ such that } w \in F_{sy}(w_i, t) \qquad \text{Math 10}$$

Then w is classified in group GW.

As for the emails $D_1$ and $D_2$, the groups obtained are listed in the table below:

TABLE 2

| Groups | Words |
| --- | --- |
| GW1 | arrange, set, set, define |
| GW2 | preliminary, preliminary |
| GW3 | interview, interview |
| GW4 | define, set, set, arrange |
| GW5 | time, time |
| GW6 | slot, slot |

In the above table, the group GW1 which included "arrange" and "set" is supplemented with "define" since "define" has the same syntactic function as "arrange" and "set", namely the verb function, and belongs to the set of verbs synonymous with "set".

Finally, if two groups of words are identical, the tagging module 13 removes either one of the two groups of words.

In the example expanded upon here, the tagging module 13 detects that the groups of words GW1 and GW4 are identical. The tagging module 13 then for example deletes the group of words GW4. The groups of words thus formed by the tagging module 13 are therefore the groups of words listed in the table below:

TABLE 3

| Groups | Words |
| --- | --- |
| GW1 | arrange, set, set, define |
| GW2 | preliminary, preliminary |
| GW3 | interview, interview |
| GW5 | time, time |
| GW6 | slot, slot |

Finally, still during sub-step S22, the tagging module 13 associates, with each word belonging to a group of words, a tag representative of that group of words.

For example, in the first email $D_1$, the words "arrange" and "define" are associated with a tag GW1, the word "preliminary" is associated with a tag GW2, the word "interview" is associated with a tag GW3, the word "time" is associated with a tag GW5, and the word "slot" is associated with a tag GW6.

Similarly, in the second email $D_2$, the words "set" and "set" are associated with a tag GW1, the word "preliminary" is associated with a tag GW2, the word "interview" is associated with a tag GW3, the word "time" is associated with a tag GW5, and the word "slot" is associated with a tag GW6.

Note that for simplicity, the tag assigned to a word in this example simply corresponds to the name of the corresponding group of words in the above table.

The grouping module 15 is arranged to generate, for each text file among the first and second text files, at least one dense set of words from the text file.

Each word in a dense set of words from a text file is associated with a tag. In addition, a dense set of words from a text file satisfies a condition of internal proximity in the text file in question.

Thus, during a sub-step S23, the grouping module 15 generates at least one dense set of words for each of the first and second text files $D_1$ and $D_2$.

To do this, the grouping module 15 assigns, to each word in a given text file, a numeric value representative of a position of that word within the text file considered.

It is therefore understood here that, at this stage of the detection method corresponding to step S2 of the classification method, each word of a text file belonging to a group of words is associated not only with a tag representative of the group of words to which it belongs but also with a numeric value representative of its position within the text file. On the other hand, a word of a text file not belonging to any group of words, for example the word "person" in email $D_1$ or the word "send" in email $D_2$, is associated only with a numeric value representative of its position within the text file.

The numeric value representative of a position of a word within a text file is for example determined as a function of the rank of this given word in the ordered sequence of words in the text file.

Advantageously, in such an embodiment, the rank of a word within a text file is the rank of this word after the sub-step S21 of preprocessing the text file.

Considering again the example of the first and second emails $D_1$, $D_2$ expanded upon here: each word of an email among $D_1$ and $D_2$ after preprocessing is associated with a numeric value representative of its rank within this preprocessed email. The rank of a given word corresponds, for example, to the number of words preceding the given word. Indeed, in the context of the invention it is considered that the words of a text file are ordered.

The numeric value associated with each word is indicated in parentheses below:

- $D_1$: "arrange (0)preliminary (1) interview (2) trader (3)position (4)person (5) availability (6) week (7) contact (8) define (9) time (10) slot (11)".
- $D_2$: "interview (0) set (1) student (2) forum (3) hold (4) probably (5)find (6) potential (7) candidate (8) set (9) time (10) slot (11) send (12) feedback (13) concern (14)preliminary (15) interview (16)".

For example, in the first email $D_1$, the word "interview" is associated both with tag GW3, since this word has been classified in a group characterized by tag GW3, and with the numeric value 2, since two words, namely "arrange" and "preliminary", precede the word "interview" in the first preprocessed email $D_1$.

Then, still during sub-step S23, the grouping module 15 generates, for a given text file, at least one dense set of words from the text file as follows:

- if the absolute value of the difference of the numeric values respectively associated with two words is less than or equal to a predetermined threshold, the grouping module 15 classifies these two words in a same dense set of words from the text file,
- otherwise, the grouping module 15 classifies these two words in separate dense sets of words from the text file.

In other words:

$$\text{let } w_1 \text{ and } w_2 \in D, \text{if } |V[w_1]-V[w_2]| \leq M \qquad \text{Math 11}$$

Then $w_1$ and $w_2$ are classified in the same dense set EX. where:

- $w_1$ and $w_2$ are words, each associated with a tag, from a text file D among the first and second text files $D_1$ and $D_2$,
- $V[w_1]$ and $V[w_2]$ are the numeric values representative of the respective positions of words $w_1$ and $w_2$ in text file $D_1$, and
- M is a predetermined threshold value, Again with reference to the example of the first email $D_1$ and second email $D_2$, these two emails are reproduced below, with the associated numeric value for each word as well as the tag assigned by the tagging module 13 for the words concerned:

- $D_1$: "arrange (0, GW1) preliminary (1, GW2) interview (2, GW3) trader (3) position (4) person (5) availability (6) week (7) contact (8) define (9, GW1) time (10, GW5) slot (11, GW6)"
- $D_2$: "interview (0, GW3) set (1, GW1) student (2)forum (3) hold (4) probably (5)find (6) potential (7) candidate (8) set (9, GW1) time (10, GW5) slot (11, GW6) send (12)feedback (13) concern (14)preliminary (15, GW2) interview (16, GW3)"

Furthermore, the predetermined threshold value M is for example equal to 3.

The grouping module 15 thus generates the dense sets of words listed in the tables below:

For the first email $D_1$:

TABLE 4

| Dense sets | Words |
|---|---|
| EX1 | arrange (0, GW1) preliminary (1, GW2) interview (2, GW3) |
| EX2 | define (9, GW1) time (10, GW5) slot (11, GW6) |

For the second email $D_2$:

TABLE 5

| Dense sets | Words |
|---|---|
| EX3 | interview (0, GW3) set (1, GW1) |
| EX4 | set (9, GW1) time (10, GW5) slot (11, GW6) |
| EX5 | preliminary (15, GW2) interview (16, GW3) |

The correlation module 17 is arranged to determine, for at least one pair of a dense set of words from the first text file and a dense set of words from the second text file, at least one pattern in common in the first and second text files.

Each pattern in common includes one or more sets of words.

Each set of words comprises at least one word in the dense set of words from the first text file and at least one word in the dense set of words from the second text file. Also, words in a same set of words share the same tag. Finally, for a set of words in a pattern in common associated with a given pair of a dense set of words from the first text file and a dense set of words from the second text file, the words in this set of words belong to the dense set of words from the first text file or to the dense set of words from the second text file.

Thus, during a sub-step S24, the correlation module 17 determines one or more patterns in common, a pattern in common being determined for each pair of a dense set of words from the first text file and a set of words from the second text file.

In other words, the correlation module 17 determines one or more patterns in common in the first and second text files as follows:

$$\text{PTRN}_{p,q} = \{E_{Lab_i(p,q)}\} \qquad \text{Math 12}$$

$$E_{Lab_i(p,q)} = \{w_l \in EX_p \cup EX_q \text{ such that } L[w_l] = Lab_i(p,q)\} \qquad \text{Math 13}$$

where:

- $\text{PTRN}_{p,q}$ is the pattern in common obtained from the $p^{th}$ dense set of words $EX_p$ from the first text file $D_1$ and from the $q^{th}$ dense set of words $EX_q$ from the second text file $D_2$,
- $Lab_i(p,q)$ is the $i^{th}$ tag satisfying:

$$\exists w_1 \in EX_p \text{ and } \exists w_2 \in EX_q \text{ such that } L[w_1] = L[w_2] = Lab_i(p,q), \qquad \text{Math 14}$$

- $L[w_1]$ and $L[w_2]$ are the respective tags of words $w_1$ and $w_2$ respectively belonging to the dense sets of words $EX_p$ and $EX_q$, and
- $E_{Lab_i(p,q)}$ is the set of words from $EX_p$ and from $EX_q$ sharing the same tag $Lab_i(p,q)$ and comprising at least one word belonging to $EX_p$ and at least one word belonging to $EX_q$.

Concerning the first and second emails $D_1$ and $D_2$, the correlation module 17 analyzes a total of six pairs of dense sets since the grouping module 15 generated two dense sets $EX_1$ and $EX_2$ of words from the first email $D_1$ and three dense sets EX3, EX4 and EX5 of words from the second email $D_2$. For each pair, at most one pattern in common can be determined.

For example, consider the pair formed by the dense set $EX_1$ of the first email $D_1$ and the dense set $EX_3$ of the second email $D_2$. The correlation module 17 first searches for the tag or tags present in both of the two dense sets $EX_1$ and $EX_3$. The tags GW1 and GW3 are present in the two dense sets $EX_1$ and $EX_3$. In contrast, tag GW2 is only present in dense set EX. The correlation module 17 therefore determines a pattern in common. This pattern in common is a set of two sets of words (one set of words matches tag GW1 and one set of words matches tag GW3). The pattern in common determined is therefore the following: {arrange, set}, {interview}

As another example, we consider the pair formed by the dense set $EX_2$ of the first email $D_1$ and the dense set $EX_5$ of the second email $D_2$. The correlation module 17 first searches for the tag or tags present in both of the two dense sets $EX_2$ and $EX_5$. Here, there are none. This is because the tags GW1, GW5 and GW6 are only present in dense set $EX_2$, while tags GW2 and GW3 are only present in dense set $EX_5$. The correlation module 17 therefore does not determine any pattern in common for this pair of dense sets.

The patterns in common determined by the correlation module 17 for the first and second emails $D_1$ and $D_2$ are listed in the table below:

TABLE 6

| Patterns in common | Sets of words |
|---|---|
| $PTRN_{1,3}$ | {arrange, set}, {interview} |
| $PTRN_{1,4}$ | {arrange, set} |
| $PTRN_{1,5}$ | {preliminary}, {interview} |
| $PTRN_{2,3}$ | {define, set} |
| $PTRN_{2,4}$ | {define, set}, {time}, {slot} |

Optionally, in a sub-step S25, the correlation module 17 deletes the patterns in common that include fewer than two sets of words. Such filtering makes it possible to retain only the most significant patterns in common.

In the example expanded upon here, the correlation module 17 therefore removes the patterns in common $PTRN_{1,4}$ and $PTRN_{2,3}$ which each comprise only a single set of words. The patterns in common remaining at the end of this sub-step S25 are listed in the table below:

TABLE 7

| Patterns in common | Sets of words |
|---|---|
| $PTRN_{1,3}$ | {arrange, set}, {interview} |
| $PTRN_{1,5}$ | {preliminary}, {interview} |
| $PTRN_{2,4}$ | {define, set}, {time}, {slot} |

As explained above, the detection system 5 comprises several modules, namely the tagging module 13, the grouping module 15, and the correlation module 17. Each module typically comprises a memory and a processor. The memory of a module is arranged to store instructions, which when implemented by the processor result in the operation of the module.

Advantageously, in a sub-step S26, the pattern database 7 is updated by comparing each set of words from a pattern in common in a pair of text files with each set of words from a pattern in common in another pair of text files.

For example, if a set of words from a pattern in common in a first pair of text files is comprised in a set of words from a pattern in common in a second pair of text files, the set of words from the pattern in common in the first pair of text files is supplemented with one or more missing words coming from the set of words from the pattern in common in the second pair of text files.

Indeed, as described above, the detection of patterns in common in a set of text files is implemented per pair of text files. Thus, rather than testing all possible pairs of text files, the proposed update allows extending each pattern in common detected for a pair of text files to all of the text files.

For example, the detection system 5 is arranged to update the pattern database 7.

Finally, in a sub-step S27, the patterns in common stored in the pattern database 7 are filtered according to their respective frequencies of occurrence. Thus, a pattern in common is deleted from the pattern database 7 if its frequency of occurrence in the set of text files is less than a predetermined threshold frequency.

For example, the detection system 5 is arranged to filter the patterns in common according to the respective frequencies of occurrence of these patterns in common.

Such filtering makes it possible to retain only the most relevant patterns in the set of text files and to remove isolated patterns only common to a few pairs of text files that are outliers in comparison to the set of text files.

The invention has several advantages.

The proposed method for detecting patterns in common in a set of text files makes it possible to account for variations in the relative positions and the dispersion of words in common and of their synonyms, from one text file to another. Taking into account the syntactic function of words makes it possible to avoid generating noise from incidental patterns in common, while the use of a lexical database makes it possible to avoid missing patterns in common that are expressed by different sequences of words.

Furthermore, applying the method for detecting patterns in common in a set of text files to emails received by an electronic mail system makes automatic classification of emails possible.

Finally, since the classification obtained is based on the textual content of emails and not on elements usually dedicated to classification such as the "subject" field of emails, this classification is more relevant and can allow constructing a database of data that can be used, for example, to characterize textually a professional activity or a daily topic.

The invention claimed is:

1. A method of classifying text files, the method, implemented by a system for classifying text files having a hardware processor, comprising:
   receiving, at a communication module of the system for classifying text files, a set of text files,
   in a system for detecting patterns, detecting, for at least one pair of first and second text files in the set of text files, at least one pattern in common by:
      generating, by a tagging module of the system, for at least one pair of first and second text files in the set of text files, one or more groups of words each comprising at least one word in the first text file and at least one word in the second text file, the words in a same group of words having the same syntactic function, and each word in a group of words belonging to a set of words synonymous for that syntactic function with another word in the group of words,
      associating, by the tagging module, each word in a generated group of words with a tag representative of the group of words,
      generating, by a grouping module of the system, for each text file among the first and second text files, at least one dense set of words associated with a tag and satisfying a condition of internal proximity in the text file,
      determining, by a correlation module of the system, at least one pattern in common in the first and second text files, a pattern in common including one or more sets of words sharing the same tag and comprising at least one word from a dense set of words in each text file among the first and second text files, storing each detected pattern in common, in a pattern database, generating, at a labeling module of the system for classifying text files, a label characteristic of a set of patterns stored within the pattern database, and classifying each text file in a database of text files according to a label associated with a set of patterns comprising at least one pattern detected in the text file.

2. The method of claim 1, further comprising a preprocessing of at least the first and second text files that is implemented before generating the group or groups of words, by the tagging module, the preprocessing comprising one or more of the following operations: lemmatization, detection of compound words, deletion of stop words, detection of redundant words, replacement of numeric values by a tag, replacement of proper noun by a tag, and detection and deletion of redundant text blocks.

3. The method of claim 1, wherein the generating of the group or groups of words, by the tagging module, comprises:

for any given word in the first text file, if there is a word in the second text file such that the given word in the first text file and the word in the second text file have the same syntactic function and such that one among the given word in the first text file and the word in the second text file belongs to a set of words synonymous with the other for the syntactic function, classifying the given word in the first text file and the word in the second text file in a same group of words, for any given word in the first or second text file, if there is a group of words such that the syntactic function of the given word is the same as the syntactic function of the words in the group of words and such that the given word belongs to the set of words synonymous for the syntactic function with at least one of the words in the group of words, classifying the given word in the group of words, and if two groups of words are identical, deleting either one of the two groups of words.

4. The method of claim 1, wherein each word in a given text file among the first and second text files being associated with a numeric value representative of a position of the word within the text file, wherein, for a text file, the generation of at least one dense set of words from the text file is implemented as follows: if the absolute value of the difference of the numeric values respectively associated with two words is less than or equal to a predetermined threshold, classifying the two words in a same dense set of words from the text file, otherwise, classifying the two words into separate dense sets of words from the text file.

5. The method of claim 4, wherein the numeric value representative of a position of a word within a text file is determined as a function of a rank of the given word in the ordered sequence of words from the text file.

6. The method of claim 1, further comprising the deletion of patterns in common that include less than two sets of words.

7. The method of claim 1, wherein the set of synonyms of a word according to its syntactic function is determined by a search in a lexical database.

8. The method of claim 1, further comprising updating of a pattern database by comparing each set of words of a pattern in common in a pair from text files to each set of words of a pattern in common in another pair of text files.

9. The method of claim 8, wherein the updating of the pattern database comprises: if a set of words of a pattern in common in a first pair of text files is comprised in a set of words of a pattern in common in a second pair of text files, supplementing the set of words of the pattern in common in the first pair of text files with one or more missing words coming from the set of words of the pattern in common in the second pair of text files.

10. The method of claim 1, further comprising filtering of the patterns in common according to a frequency of occurrence of the patterns in common, a pattern in common being deleted if its frequency of occurrence across the set of text files is below a predetermined threshold frequency.

11. The method of claim 1, wherein one or more text files in the set of text files are emails and the database of text files is comprised in an electronic mail system.

12. A non-transitory computer-readable storage medium comprising a computer program stored thereon and comprising instructions for implementing the method of claim 1, when the instructions are executed by at least one processor.

13. A system for classifying text files, the system comprising:

a communication module arranged to receive a set of text files, a detection system for detecting a pattern in common in the set of text files arranged to detect at least one pattern in common for at least one pair of first and second text files in the set of text files, each text file comprising an ordered sequence of one or more words, a pattern database arranged to store each detected pattern in common, a labeling module configured to receive a set of patterns from the pattern database and arranged to generate a label characteristic of the received set of patterns and to further store the generated label associated with the set of patterns in the pattern database, a database of text files that is arranged to store each text file received by the communication module, the text file being classified within the database of text files according to the generated label associated with the set of patterns comprising at least one pattern detected in the text file, wherein the detection system comprises:

a tagging module arranged to generate, for at least one pair of first and second text files in the set of text files, one or more groups of words each comprising at least one word in the first text file and at least one word in the second text file, the words in a same group of words having the same syntactic function, and each word in a group of words belonging to a set of words synonymous for this syntactic function with another word in the group of words, the tagging module further being arranged to associate, with each word in a generated group of words, a tag representative of the group of words, a grouping module arranged to generate, for each text file among the first and second text files, at least one dense set of words associated with a tag and satisfying a condition of internal proximity in the text file, a correlation module arranged to determine at least one pattern in common in the first and second text files, a pattern in common including one or more sets of words sharing the same tag and comprising at least one word from a dense set of words in each text file among the first and second text files, and provide the at least one pattern in common to the pattern database, and a hardware processor configured to execute code instructions of at least the labeling module, the tagging module, the grouping module and the correlation module.

14. A non-transitory computer-readable storage medium comprising a computer program stored thereon and comprising instructions for implementing at least the labeling module, the tagging module, the grouping module and the correlation module of claim 13, when the instructions are executed by at least the hardware processor.

\* \* \* \* \*